United States Patent
Asawa et al.

(10) Patent No.: US 7,283,483 B2
(45) Date of Patent: Oct. 16, 2007

(54) TRANSMITTING MULTIPLE PACKETS IN A FRAME

(75) Inventors: Manjari Asawa, Cupertino, CA (US); Malcolm M. Smith, Calgary NW (CA)

(73) Assignee: Cisco Technology, Inc., San Jose, CA (US)

( * ) Notice: Subject to any disclaimer, the term of this patent is extended or adjusted under 35 U.S.C. 154(b) by 1055 days.

(21) Appl. No.: 10/323,169

(22) Filed: Dec. 18, 2002

(65) Prior Publication Data

US 2004/0120319 A1    Jun. 24, 2004

(51) Int. Cl.
   *G06F 11/00*    (2006.01)
   *H04J 3/14*    (2006.01)
(52) U.S. Cl. ............... 370/252; 370/395.21; 370/230; 370/468; 370/338
(58) Field of Classification Search ........ 370/229–236, 370/252, 360, 396, 395.21, 412, 470, 466, 370/474, 230.1, 468, 338
   See application file for complete search history.

(56) References Cited

U.S. PATENT DOCUMENTS

| | | | |
|---|---|---|---|
| 5,050,161 A | 9/1991 | Golestani | 370/60 |
| 6,157,674 A | 12/2000 | Oda et al. | 375/240 |
| 6,192,032 B1 * | 2/2001 | Izquierdo | 370/230 |
| 6,430,156 B1 * | 8/2002 | Park et al. | 370/232 |
| 6,430,196 B1 | 8/2002 | Baroudi | 370/466 |

OTHER PUBLICATIONS

PCT, Notification of Transmittal of The International Search Report or the Declaration, International Application No. PCT/US03/37128, 6 pages, May 26, 2004.

* cited by examiner

*Primary Examiner*—Afsar Qureshi
(74) *Attorney, Agent, or Firm*—Baker Botts L.L.P.

(57) ABSTRACT

Transmitting packets in a frame includes receiving the packets. Delay constraints are established, where each delay constraint is associated with a packet. Frame departure times of the frames are predicted, where the frames include the packets. A packet departure time is determined for each packet in accordance with the frame departure time of the frame that includes the packet. An order of the packets is determined using the delay constraints and the packet departure times. The packets are placed in the order, and the frames are formed from the ordered packets.

18 Claims, 2 Drawing Sheets

TRANSMITTING MULTIPLE PACKETS IN A FRAME

TECHNICAL FIELD OF THE INVENTION

This invention relates generally to the field of telecommunication systems and more specifically to transmitting multiple packets in a frame.

BACKGROUND OF THE INVENTION

Packets are typically encapsulated in frames for transmission from a transmitter to a receiver. A packet of a frame may be associated with a delay constraint that indicates a time period during which the packet must be transmitted in order to be usable at the receiver. If multiple packets are transmitted in a frame, the frame waits until all packets of the frame have been encapsulated. This wait, however, may result in the violation of the delay constraints of the individual packets. Consequently, known techniques for transmitting multiple packets in a frame are unsatisfactory for some situations.

SUMMARY OF THE INVENTION

In accordance with the present invention, disadvantages and problems associated with previous techniques for transmitting multiple packets in a frame may be reduced or eliminated.

According to one embodiment of the present invention, transmitting packets in a frame includes receiving the packets. Delay constraints are established, where each delay constraint is associated with a packet. Frame departure times of the frames are predicted, where the frames include the packets. A packet departure time is determined for each packet in accordance with the frame departure time of the frame that includes the packet. An order of the packets is determined using the delay constraints and the packet departure times. The packets are placed in the order, and the frames are formed from the ordered packets.

Certain embodiments of the invention may provide one or more technical advantages. A technical advantage of one embodiment may be that a scheduler orders packets according to a departure time of a frame that encapsulates the packets. By taking into account the frame departure time, the scheduler may more accurately determine the departure time of the packets of the frame, which may allow the scheduler to order the packets such that the delay constraints of the packets are not violated.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
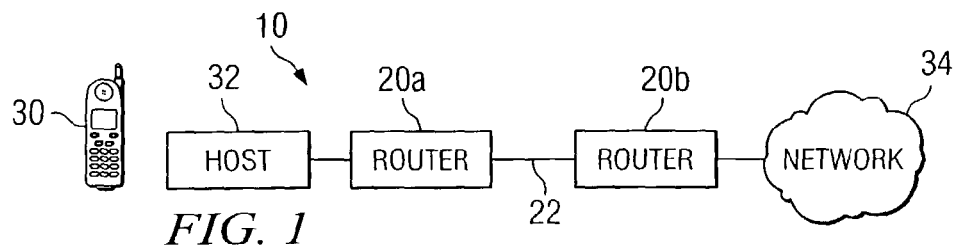
FIG. 1 is a block diagram illustrating one embodiment of a system having one or more routers that transmit multiple packets in a frame.

FIG. 1 is a block diagram illustrating one embodiment of a system 10 having one or more routers 20 that transmit multiple packets in a frame. Routers 20 include a scheduler that can receive a number of packets, determine a delay constraint for each packet, predict a departure time for a frame that might include the packets, and order the packets such that a predetermined number of delay constraints are satisfied. As used in this document, "each" refers to each member of a set or each member of a subset of the set.

According to the illustrated example, system 10 includes an Internet Protocol (IP) host 32, routers 20, wide area link 22, and a communication network 34 coupled as shown in FIG. 1. Router 20 encapsulates one or more packets in a frame. A packet may comprise an Internet Protocol (IP) packet or other bundle of data formatted for transmission. A frame may comprise a Layer 2 frame or other data unit that may be used to transmit packets. For data traffic, IP packets are typically large, so one Layer 2 frame typically encapsulates one IP packet. For example, according to point-to-point protocol (PPP) and Ethernet protocol, one frame encapsulates one packet.

For voice traffic, however, the IP packets are small, so placing one packet in one Layer 2 frame may not be efficient due to large Layer 2 framing overhead. To address this efficiency problem, multiple packets may be encapsulated in one frame. For example, according to PPP multiplexing protocol (PPPmux), multiple compressed User Datagram Protocol/compressed Realtime Transport Protocol (cUDP/cRTP) packets are encapsulated in one Layer 2 frame.

Router 20 orders multiple packets such that an optimal number of delay constraints of the packets may be satisfied. Typically, each packet has a delay constraint that indicates a maximum amount of time that the packet may remain at router 20 before being transmitted. A packet that remains after the expiration of the delay constraint may be unusable when received at the receiver. The delay constraint may take into account processing delay such as serialization delay and propagation delay such as channel delay.

The delay constraint of a packet may be associated with the priority of the packet. For example, a high priority packet may have a shorter delay constraint than the delay constraint of a lower priority packet, that is, the higher priority packet cannot stay at router 20 as long as the lower priority packet. Router 20 determines the delay constraints of the packets, predicts the departure times of the frames transporting the packets, and orders the packets such that an optimal number of the delay constraints are satisfied.

Communication network 34 may comprise a public switched telephone network (PSTN), a public or private data network, the Internet, a wired or wireless network, a local, regional, or global communication network, other suitable communication link, or any combination of the preceding.

Other methods of scheduling packets assume that each packet is placed in its own frame such that a packet does not have to wait for the encapsulation of additional packets. This assumption, however, does not work for situations in which multiple packets are encapsulated into one frame. For example, if a frame includes four packets such as a first, second, third, and fourth packet, the first packet must wait until the second, third, and fourth packets are encapsulated before being transmitted. That is, if multiple packets are encapsulated in a frame, the frame is not transmitted until all packets have been encapsulated.

Since the first packet must wait for the encapsulation of the last packet, the delay constraint of the first packet may be violated if the scheduler assumes that each packet is encapsulated in its own frame. Accordingly, router 20 determines the departure time of a packet as the departure time of the frame that includes the packet, which may allow for more packets transmitted on time.

Figure 2:
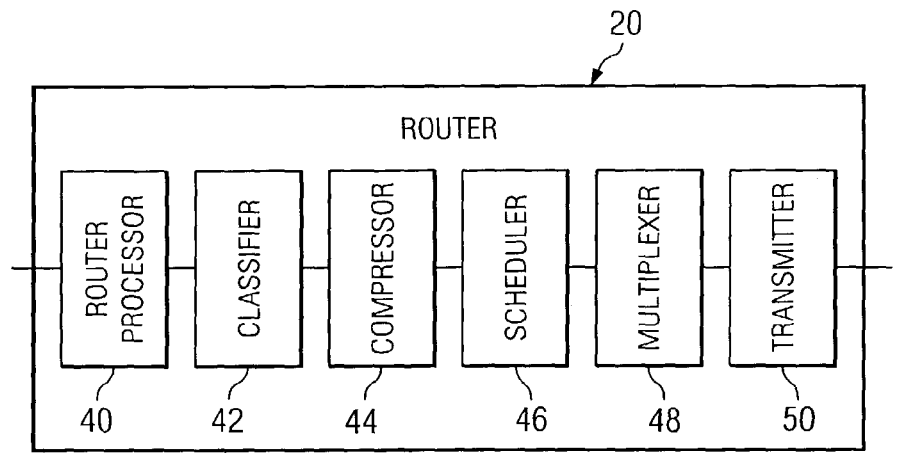
FIG. 2 is a block diagram illustrating one embodiment of a router of FIG. 1.

FIG. 2 is a block diagram illustrating one embodiment of router 20 of FIG. 1. In the illustrated embodiment, router 20 includes a router processor 40, a classifier 42, a compressor 44, a scheduler 46, a multiplexer 48, and a transmitter 50 coupled as shown in FIG. 2.

Router processor 40 determines the destination of a packet and routes the packet to the destination. Classifier 42 assigns a delay constraint to each packet that indicates the amount of time a packet may remain at router 20. Classifier 42 may assign a delay constraint by assigning a class corresponding to a delay constraint. For example, a packet may be assigned one of five classes, where each class corresponds to a delay constraint.

The delay constraint may be assigned based on a characteristic of the packet such as a packet classification, a Differentiated Services Point Code (DSCP) of the packet, a type of service, or a source or destination address of the packet. The delay constraint may be dynamically assigned to a packet. For example, classifier 42 may determine the size of a packet and the effective bandwidth, and calculate a delay constraint appropriate for the size of the packet based on the effective bandwidth.

As an example, a delay constraint may be calculated as follows. Let $r_i$ represent the effective bandwidth of flow i, $a_i^k$ represent the arrival time of the kth packet of flow i, and $L_i^k$ represent the length of the kth packet of flow i. A virtual start time $S_i^k$ and finish time $F_i^k$ for the kth packet of flow i may be computed as follows:

$$S_i^k = \min\{F_i^{k-1}, a_i^k\}$$

$$F_i^k = S_i^k + \frac{L_i^k}{r_i}$$

where $F_i^0=0$, and finish time $F_i^k$ represents the delay constraint of the kth packet of flow i.

Compressor 44 performs packet compression such as header compression. Compression may be performed according to compressed User Datagram Protocol (cUDP) or compressed Realtime Transport Protocol (cRTP). Scheduler 46 schedules the packets according to the delay constraints of the packets. Scheduler 46 determines the delay constraint of each packet, predicts the departure time of a frame that may include the packet, and orders the packets such that an optimal number of delay constraints are satisfied. Scheduler 46 provides multiplexer 48 with the packets in order. Scheduler 46 is described in more detail with reference to FIG. 3.

Multiplexer 48 multiplexes packets received from scheduler 46 to form a frame, and may multiplex packets according to a point-to-point multiplexing (PPPmux) procedure. Multiplexer 48 may also provide to scheduler 46 information that scheduler 46 may use to determine the departure time of a frame. For example, multiplexer 48 may notify scheduler 46 of when a frame has left multiplexer 48, or may inform scheduler 46 of a maximum transmission unit (MTU) of the channel. Transmitter 50 transmits frames received from multiplexer 48. The frames may be transmitted according to a point-to-point (PPP) procedure that uses an octet stream of transfer.

Figure 3:
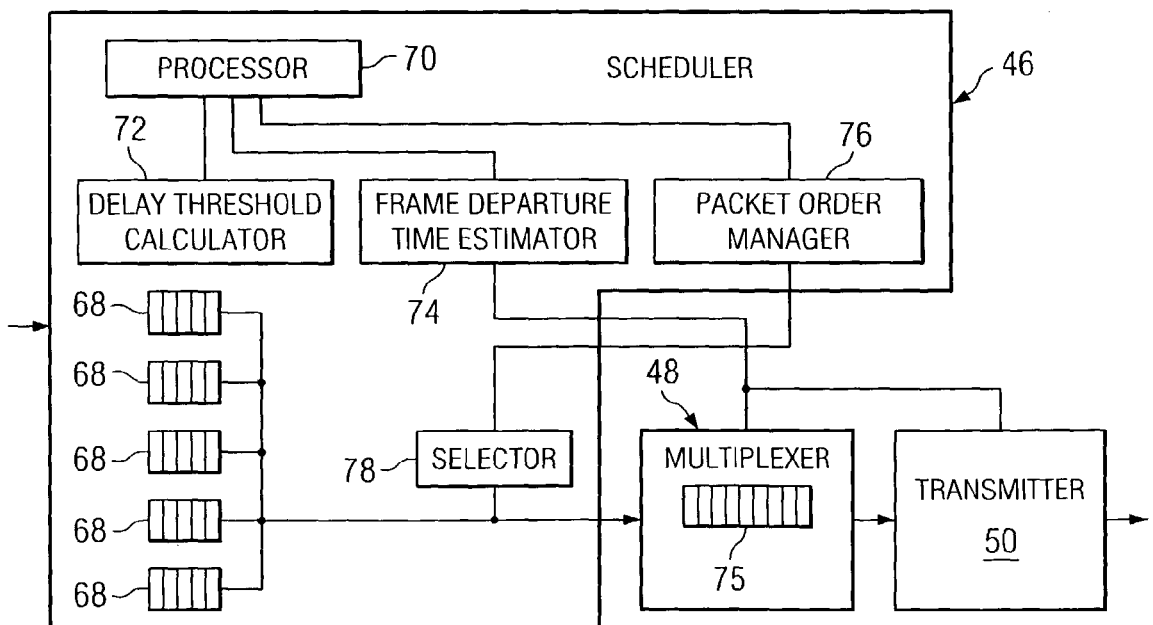
FIG. 3 is a block diagram illustrating one embodiment of a scheduler of the router of FIG. 2.

FIG. 3 is a block diagram illustrating one embodiment of scheduler 46 of router 20 of FIG. 2. Although scheduler 46 is illustrated as implemented in router 20, scheduler 46 may be implemented in any system that involves placing one or more packets in a frame.

Scheduler 46 includes buffers 68, a processor 70, a delay constraint calculator 72, a frame departure time estimator 74, a packet order manager 76, and a selector 78 coupled as shown in FIG. 3. Packets are received from compressor 44 at buffers 68. In the illustrated example, a packet may be received at a buffer 68. Processor 70 manages the operation of scheduler 46. Processor 70 is operable to accept input, process the input according to predefined rules, and produce output. Delay constraint calculator 72 determines the delay constraint for each packet. The delay constraint may be determined according to a class assigned to the packet by classifier 42.

Frame departure time estimator 74 predicts the departure time for a packet by determining the time that a frame that includes the packet leaves multiplexer 48, in a given packet order. Frame departure time estimator 74 may predict a frame departure time using information from multiplexer 48. For example, multiplexer 48 may notify frame departure time estimator 74 when multiplexer 48 has sent a previous frame to transmitter 50. The frame departure time may also be determined in accordance with a buffer size of or a maximum delay at a buffer 75 of multiplexer 48.

Packet order manager 76 orders the packets such that an optimal number of delay constraints are satisfied. The packets may be ordered by determining a time budget defined as the difference between a delay constraint of a packet and a frame departure time of a frame that includes the packet. A positive time budget indicates that the delay constraint is larger than the frame departure time such that the frame departure time satisfies the delay constraint. A negative time budget indicates that the delay constraint is less than the frame departure time such that the delay constraint is not satisfied. Packets having smaller time budgets may be placed before packets having larger time budgets, so that the packets with smaller time budgets are more likely to be placed in frames that leave before frames encapsulating packets with larger time budgets.

Any suitable process for ordering packets, however, may be used. For example, if the delay constraint of a packet is not satisfied, the packet may be moved before another packet, if the move does not violate the delay constraint of the other packet. Selector 78 selects packets from buffers 68 in the order given by packet order manager 76, and send the packets to buffer 75 of multiplexer 48.

Figure 4:
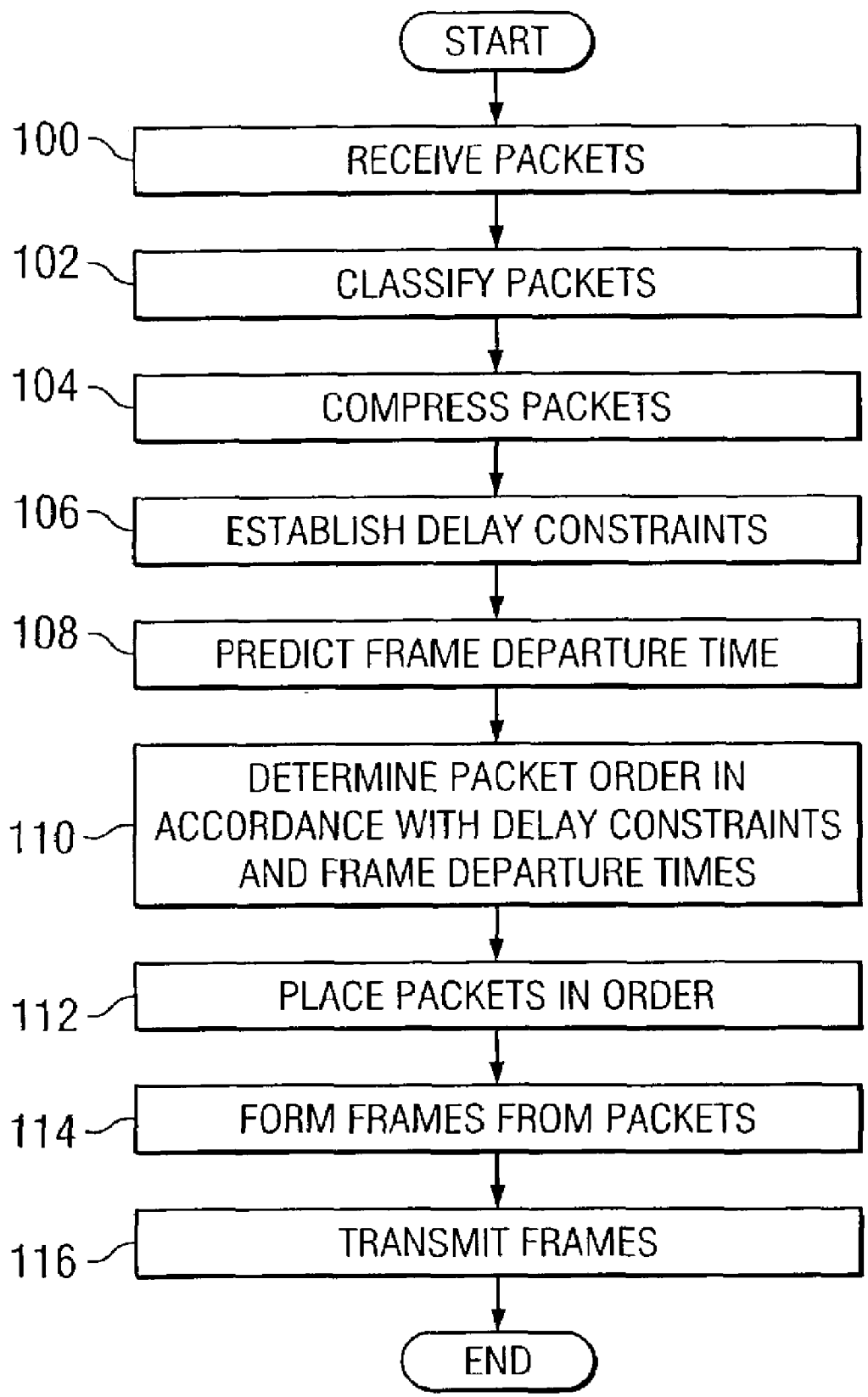
FIG. 4 is a flowchart illustrating one embodiment of a method for transmitting one or more packets in a frame.

FIG. 4 is a flowchart illustrating one embodiment of a method for transmitting one or more packets in a frame. The method begins at step 100, where router 20 receives a number of packets. The packets may initially be placed in the order received from compressor 44. Classifier 42 classifies the packets at step 102. The classification of a packet may be used to indicate a delay constraint of the packet. For example, a packet may be assigned one of five classes, where each class corresponds to a specific delay constraint.

Compressor 44 performs packet compression such as header compression on the packets at step 104.

Delay constraint calculator 72 of scheduler 46 establishes the delay constraint of each packet at step 106. The delay constraint of a packet may be determined from the class assigned to the packet. Frame departure time estimator 74 predicts the frame departure times at step 108. The frame departure times are for the frames that would include the packets in the current order. The frame departure time of a frame that includes a packet is used as the packet departure time of the packet. A frame departure time for a frame may be predicted using information received from multiplexer 48 such as the departure time of a previous frame.

Packet order manager 76 determines the packet order in accordance with the delay constraints and frame departure times at step 110. Packets may be ordered in accordance with the time budgets of the packets. Selector 78 selects the packets in the order determined by packet order manager 76 at step 112. The packets are sent in order to buffer 75 of multiplexer 48. Multiplexer 75 multiplexes the packets to form frames at step 114. The frames are sent to transmitter 50, which transmits the frames at step 116. After transmitting the frames, the method terminates.

The method may be modified without departing from the scope of the invention. For example, steps may be omitted or rearranged, or other steps may be added. As an example, classifying the packets at step 102 may be performed before compressing the packets at step 104.

Certain embodiments of the invention may provide one or more technical advantages. A technical advantage of one embodiment may be that a scheduler orders packets according to a departure time of a frame that encapsulates the packets. By taking into account the frame departure time, the scheduler may more accurately determine the departure time of the packets of the frame, which may allow the scheduler to order the packets such that the delay constraints of the packets are not violated.

Although an embodiment of the invention and its advantages are described in detail, a person skilled in the art could make various alterations, additions, and omissions without departing from the spirit and scope of the present invention as defined by the appended claims.

What is claimed is:

1. A method for transmitting a plurality of packets in a frame, comprising:
   receiving a plurality of packets;
   establishing a plurality of delay constraints, each delay constraint associated with a packet;
   predicting one or more frame departure times of one or more frames, the one or more frames comprising the packets;
   determining a packet departure time for each packet in accordance with the frame departure time of the frame comprising the packet;
   determining an order of the packets in accordance with the delay constraints and the packet departure times;
   placing the packets in the order; and
   forming the one or more frames from the ordered packets.

2. The method of claim 1, further comprising repeating the following until a predetermined number of delay constraints are satisfied:
   predicting one or more frame departure times of one or more frames, the one or more frames comprising the packets;
   determining a packet departure time for each packet in accordance with the frame departure time of the frame comprising the packet; and
   determining an order of the packets in accordance with the delay constraints and the packet departure times.

3. The method of claim 1, wherein determining an order of the packets in accordance with the delay constraints and the packet departure times compnses:
   calculating a time budget for each packet, the time budget representing a difference between the delay constraint associated with a packet and the packet departure time of the packet; and
   placing a first packet having a smaller time budget before a second packet having a larger time budget.

4. The method of claim 1, wherein determining an order of the packets in accordance with the delay constraints and the packet departure times compnses:
   identifying a first packet having an first delay constraint, the first delay constraint being violated; and
   placing the first packet before a second packet having a second delay constraint if the second delay constraint is satisfied.

5. The method of claim 1, wherein establishing a plurality of delay constraints comprises:
   establishing a packet size of a packet and a bandwidth of a channel, the channel operable to transport the one or more frames; and
   calculating the delay constraint associated with the packet in accordance with the packet size and the bandwidth.

6. The method of claim 1, wherein establishing a plurality of delay constraints comprises:
   establishing a characteristic associated with a packet; and
   calculating the delay constraint associated with the packet in accordance with the characteristic.

7. The method of claim 1, wherein predicting one or more frame departure times of one or more frames comprises:
   establishing a buffer size of a buffer operable to receive a frame of the one or more frames; and
   determining a frame departure time in accordance with the buffer size of the buffer.

8. The method of claim 1, wherein predicting one or more frame departure times of one or more frames comprises:
   establishing a maximum delay of a buffer operable to receive a frame of the one or more frames; and
   determining a frame departure time in accordance with the maximum delay of the buffer.

9. A scheduler for transmitting a plurality of packets in a frame, comprising:
   a processor operable to:
     establish a plurality of delay constraints, each delay constraint associated with a packet of a plurality of packets;
     predict one or more frame departure times of one or more frames, the one or more frames comprising the packets;
     determine a packet departure time for each packet in accordance with the frame departure time of the frame comprising the packet; and
     determine an order of the packets in accordance with the delay constraints and the packet departure times; and
   a selector coupled to the processor and operable to place the packets in the order, the one or more frames formed from the ordered packets.

10. The scheduler of claim 9, wherein the processor is further operable to repeat the following until a predetermined number of delay constraints are satisfied:
   predict one or more frame departure times of one or more frames, the one or more frames comprising the packets;

determine a packet departure time for each packet in accordance with the frame departure time of the frame comprising the packet; and determine an order of the packets in accordance with the delay constraints and the packet departure times.

11. The scheduler of claim 9, wherein the processor is operable to determine an order of the packets in accordance with the delay constraints and the packet departure times by:

calculating a time budget for each packet, the time budget representing a difference between the delay constraint associated with a packet and the packet departure time of the packet; and placing a first packet having a smaller time budget before a second packet having a larger time budget.

12. The scheduler of claim 9, wherein the processor is operable to determine an order of the packets in accordance with the delay constraints and the packet departure times by:

identifying a first packet having an first delay constraint, the first delay constraint being violated; and placing the first packet before a second packet having a second delay constraint if the second delay constraint is satisfied.

13. The scheduler of claim 9, wherein the processor is operable to establish a plurality of delay constraints by:

establishing a packet size of a packet and a bandwidth of a channel, the channel operable to transport the one or more frames; and calculating the delay constraint associated with the packet in accordance with the packet size and the bandwidth.

14. The scheduler of claim 9, wherein the processor is operable to establish a plurality of delay constraints by:

establishing a characteristic associated with a packet; and calculating the delay constraint associated with the packet in accordance with the characteristic.

15. The scheduler of claim 9, wherein the processor is operable to predict one or more frame departure times of one or more frames by:

establishing a buffer size of a buffer operable to receive a frame of the one or more frames; and determining a frame departure time in accordance with the buffer size of the buffer.

16. The scheduler of claim 9, wherein the processor is operable to predict one or more frame departure times of one or more frames by:

establishing a maximum delay of a buffer operable to receive a frame of the one or more frames; and determining a frame departure time in accordance with the maximum delay of the buffer.

17. A system for transmitting a plurality of packets in a frame, comprising:

means for receiving a plurality of packets;

means for establishing a plurality of delay constraints, each delay constraint associated with a packet;

means for predicting one or more frame departure times of one or more frames, the one or more frames comprising the packets;

means for determining a packet departure time for each packet in accordance with the frame departure time of the frame comprising the packet;

means for determining an order of the packets in accordance with the delay constraints and the packet departure times;

means for placing the packets in the order; and means for forming the one or more frames from the ordered packets.

18. A method for tranmitting a plurality of packets in a frame, comprising:

receiving a plurality of packets;

establishing a plurality of delay constraints, each delay constraint associated with a packet, by establishing a packet size of a packet and a bandwidth of a channel, and calculating the delay constraint associated with the packet in accordance with the packet size and the bandwidth;

repeating the following until a predetermined number of delay constraints are satisfied:

predicting one or more frame departure times of one or more frames, the one or more frames comprising the packets, by establishing a buffer size of a buffer operable to receive a frame of the one or more frames and determining a frame departure time in accordance with the buffer size of the buffer;

determining a packet departure time for each packet in accordance with the frame departure time of the frame comprising the packet; and determining an order of the packets in accordance with the delay constraints and the packet departure times by calculating a time budget for each packet, the time budget representing a difference between the delay constraint associated with a packet and the packet departure time of the packet, and placing a first packet having a smaller time budget before a second packet having a larger time budget;

placing the packets in the order; and forming the one or more frames from the ordered packets.

* * * * *